US012222681B2

(12) United States Patent
Lagorgette

(10) Patent No.: US 12,222,681 B2
(45) Date of Patent: Feb. 11, 2025

(54) DISPLAY MECHANISM FOR A WATCH

(71) Applicant: ETA SA Manufacture Horlogère Suisse, Grenchen (CH)

(72) Inventor: Pascal Lagorgette, Bienne (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 933 days.

(21) Appl. No.: 17/109,203

(22) Filed: Dec. 2, 2020

(65) Prior Publication Data

US 2021/0200154 A1 Jul. 1, 2021

(30) Foreign Application Priority Data

Dec. 31, 2019 (EP) .................................... 19220190

(51) Int. Cl.
*G04B 19/04* (2006.01)
*G04B 19/02* (2006.01)
*G04B 45/00* (2006.01)

(52) U.S. Cl.
CPC ........... *G04B 19/044* (2013.01); *G04B 19/02* (2013.01); *G04B 45/0061* (2013.01)

(58) Field of Classification Search
CPC ... G04B 19/044; G04B 19/02; G04B 45/0061
See application file for complete search history.

(56) References Cited

U.S. PATENT DOCUMENTS 4,979,155 A 12/1990 Tung
6,084,828 A * 7/2000 Bland .................. G04G 9/0082 368/80
6,600,527 B1 * 7/2003 Basturk ................ G04G 9/0082 368/242
7,961,560 B2 6/2011 Hiraga et al.
8,743,664 B2 6/2014 Mintiens
10,222,750 B2 * 3/2019 Bang ...................... G04G 9/007
(Continued)

FOREIGN PATENT DOCUMENTS

CH 714 708 A2 9/2019
CN 102346426 B 8/2013
(Continued)

OTHER PUBLICATIONS

Combined Chinese Office Action and Search Report issued Jan. 26, 2022 in Chinese Patent Application No. 202011629220.2 (with English translation of Categories of Cited Documents), 10 pages.
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A display mechanism for a watch and a watch including the display mechanism, which includes a display for displaying information, a first and second mobile elements and a support, so that when the first mobile element moves with a first primary speed, the second mobile element moves into a first position so as to cover the display and when the first mobile element moves with a first secondary speed, the second mobile element moves into a second position so as to expose the display. Thus, the display can be exposed which allows to maximize the display surface when information is present on the display.

15 Claims, 5 Drawing Sheets

(56) References Cited

U.S. PATENT DOCUMENTS

| | | | | |
|---|---|---|---|---|
| 10,809,667 | B2 * | 10/2020 | Olwal | G04G 21/00 |
| 2014/0347963 | A1 * | 11/2014 | El Alej | G04G 17/045 368/29 |
| 2016/0004276 | A1 * | 1/2016 | Stroetmann | G04G 9/007 361/679.03 |
| 2017/0300016 | A1 * | 10/2017 | Lider | G04G 9/0082 |
| 2018/0107165 | A1 * | 4/2018 | Kato | G04C 3/146 |
| 2018/0196396 | A1 * | 7/2018 | Cho | G04G 9/0094 |
| 2020/0073330 | A1 * | 3/2020 | Tortora | G04B 31/08 |

FOREIGN PATENT DOCUMENTS

| | | | |
|---|---|---|---|
| CN | 203422565 | U | 2/2014 |
| CN | 104204967 | A | 12/2014 |
| CN | 107290947 | A | 10/2017 |
| CN | 107850869 | A | 3/2018 |
| EP | 3 333 651 | A1 | 6/2018 |
| EP | 3 534 223 | A1 | 9/2019 |
| JP | 2005-17236 | A | 1/2005 |
| KR | 10-2017-0017640 | A | 2/2017 |
| KR | 10 2017 0068123 | A | 6/2017 |
| WO | WO 2016/141393 | A1 | 9/2016 |

OTHER PUBLICATIONS

Combined Chinese Office Action and Search Report issued Jul. 6, 2022 in Chinese Patent Application No. 202011629220.2 (with English translation of Category of Cited Documents), 7 pages.

European Search Report issued Jun. 25, 2020 in European Application 19220190.3 filed Dec. 31, 2019 (with English Translation of Categories of Cited Documents), 3 pages.

Korean Office Action issued Oct. 13, 2022 in Korean Patent Application No. 10-2020-0187767 (with English translation), 11 pages.

Combined Taiwanese Office Action and Search Report issued Feb. 24, 2022 in Taiwanese Patent Application No. 109141720 (with English translation of categories of cited documents), 10 pages.

* cited by examiner

DISPLAY MECHANISM FOR A WATCH

CROSS-RFERENCE TO RELATED APPLICATION

This application claims priority to European Patent Application No. 19220190.3 filed on Dec. 31, 2019, the entire disclosure of which is hereby incorporated herein by reference.

TECHNICAL FIELD

The present invention relates to that of horology, and more precisely that of the display mechanisms allowing to display information on a dial. Preferably, the present invention relates to the field of watch indicators and preferably smartwatch indicators.

TECHNOLOGICAL BACKGROUND

The last few years have seen a rise in smartwatches. The screens of these watches are continuously turned on in order to display at least the time, which leads to a non-negligible energy consumption and thus forces the user to recharge their watch regularly.

There are also solutions with conventional hands, but these solutions are not satisfactory since they require a special screen, that is to say a screen with an opening in the middle so as to let the pipes of the hands pass through. One of the disadvantages is the fragility of the screen that is caused by this opening which means the manufacturer having shock-absorption means in order to minimise the risks of the screen breaking, not to mention the space taken up by these hands on the screen.

SUMMARY OF THE INVENTION

The present invention proposes solving all or a part of these disadvantages via a display mechanism for a watch and preferably of a watch, said display mechanism comprising at least:

- a display, said at least one display being configured to display a piece of information;
- a first mobile element, said at least one first mobile element being configured to move with a first primary speed in a primary operating mode and with a first secondary speed in a secondary operating mode;
- a second mobile element, said at least one second mobile element being configured to move between at least one first position so as to totally or partly cover said at least one display in said primary operating mode and at least one second position so as to totally or partly expose said at least one display, preferably said piece of information, in said secondary operating mode; and
- a support, said at least one support being configured to allow the movement of said at least one second mobile element between said at least one first position and said at least one second position according to said first primary speed and said first secondary speed.

Via this arrangement, the display can be totally or partly exposed which allows to maximise the display surface when a piece of information is present on the display. Moreover, according to the embodiments, the use of hands to display the time allows a saving of energy with respect to the display of the time or any other piece of information on the display.

According to one embodiment, said at least one second mobile element is totally or partly outside of said at least one display in said at least one second position.

Via one of these arrangements, the display can be totally or partly exposed which allows to maximise the display surface when a piece of information is present on the display.

According to one embodiment, said at least one first mobile element and/or said at least one support is or are on the periphery and/or at the periphery of said at least one display.

According to one embodiment, which said at least one first mobile element and/or said at least one support is disposed or are disposed next to said at least one display.

Via one of these arrangements, the display surface is totally or partly exposed.

According to one embodiment, said at least one support is configured to move with a second primary speed in said primary operating mode and with a second secondary speed in a secondary operating mode so as to allow the movement of said at least one second mobile element between said at least one first position and said at least one second position.

According to one embodiment, said at least one first mobile element moves with respect to said at least one support.

According to one embodiment, said at least one support moves with respect to said at least one first mobile element.

According to one embodiment, said first primary speed and said first secondary primary are determined with respect to said at least one support.

According to one embodiment, said second primary speed and said second secondary speed are determined with respect to said at least one first mobile element.

According to one embodiment, said at least one second mobile element moves between said at least one first position and said at least one second position when said first primary speed is different than said second primary speed and/or when said first secondary speed is different than said second secondary speed.

According to one embodiment, said at least one second mobile element is mobile between said at least one first position and said at least one second position when the direction of movement of said at least one first mobile element is different than the direction of movement of said at least one support.

According to one embodiment, said at least one second mobile element is mobile between said at least one first position and said at least one second position when said at least one first mobile element and/or said at least one support moves or move in the anticlockwise direction.

According to one embodiment, said at least one second mobile element is mobile between said at least one first position and said at least one second position when said at least one first mobile element moves in the anticlockwise direction and said at least one support is static or when said at least one support moves in the anticlockwise direction and said at least one first mobile element is static.

Via one of these arrangements, said at least one second mobile element indicates a piece of information when said at least one first mobile element and/or said at least one support moves or move in the same direction of movement and preferably in the clockwise direction, and when said at least one first mobile element or said at least one support move in the opposite direction and preferably in the anticlockwise direction, said at least one second mobile element totally or partly exposes the display.

According to one embodiment, comprises at least one primary stop member, at least one secondary stop member, at least one primary bearing member, and/or at least one secondary bearing member; said at least one primary bearing member and/or at least one secondary bearing member being configured or are configured to be stopped against said at least one primary stop member in said primary operating mode and/or against said at least one secondary stop member in said secondary operating mode.

According to one embodiment, said at least one primary bearing member is maintained stopped against said at least one primary stop member in said primary operating mode.

According to one embodiment, said at least one primary bearing member is maintained stopped against said at least one secondary stop member in said secondary operating mode.

According to one embodiment, said at least one secondary bearing member is maintained stopped against said at least one primary stop member in said primary operating mode.

According to one embodiment, said at least one secondary bearing member is maintained stopped against said at least one secondary stop member in said secondary operating mode.

Via this arrangement, said at least one second mobile element can totally or partly cover or expose said at least one display when said at least one first mobile element and said at least one support are mobile with respect to one another or when said at least one first mobile element or said at least one support are immobile with respect to one another.

According to one embodiment, said at least one primary bearing member is at least one leaf of a pinion or at least one tooth of a wheel.

According to one embodiment, said at least one second mobile element comprises said at least one primary stop member and/or said at least one secondary stop member.

According to one embodiment, said at least one primary bearing member and/or said at least one secondary stop member is or are at least one wall of said at least one first mobile element and/or of said at least one support.

According to one embodiment, the display mechanism comprises a freewheel; said freewheel comprises said at least one primary stop member, said at least one secondary stop member, said at least one primary bearing member and/or said at least one secondary bearing member.

According to one embodiment, the display mechanism comprises a dragging rack; said dragging rack comprises said at least one primary bearing member and said at least one first mobile element and/or said at least one support comprises said at least one primary stop member and/or said at least one secondary bearing member.

According to one embodiment, the display mechanism comprises a Maltese pin; said Maltese pin comprises said at least one primary bearing member and said at least one first mobile element and/or said at least one support comprises said at least one primary stop member and/or said at least one secondary bearing member.

Via one of these arrangements, said at least one second mobile element can totally or partly expose said at least one display when said at least one first mobile element and/or said at least one support is mobile or are mobile with respect to one another.

According to one embodiment, comprises at least one housing configured to totally and/or partly house said at least one second mobile element.

According to one embodiment, said at least one housing is comprised in said at least one wall of said at least one first mobile element and/or of said at least one support.

Via one of these arrangements, said at least one second mobile element can totally or partly expose said at least one display by being housed in said at least one first mobile element and/or in said at least one support.

According to one embodiment, comprises at least one drive member disposed under said at least one display, on the periphery and/or at the periphery of said at least one display and/or configured to move said at least one first mobile element and/or said at least one support.

Via this arrangement, said at least one first mobile element and/or said at least one support is or are mobile.

According to one embodiment, said at least one second mobile element is movably mounted on said at least one first mobile element and/or said at least one support.

According to one embodiment, said at least one first mobile element is mounted to slide on and/or against said at least one support or said at least one support is mounted to slide on or against said at least one first mobile element.

According to one embodiment, said at least one second mobile element is mobile between at least one first position and at least one second position when said at least one first mobile element slides on and/or against said at least one support.

According to one embodiment, said at least one second mobile element is mobile between at least one first position and at least one second position when said at least one support slides on and/or against said at least one first mobile element.

Via one of these arrangements, a saving of space is achieved.

According to one embodiment, said at least one second mobile element is configured to indicate an indication in said at least one first position and/or in said at least one second position.

According to one embodiment, said at least one second mobile element is configured to be visible in said at least one first position and/or in said at least one second position.

According to one embodiment, said at least one second mobile element is an indicator and/or a hand.

Via this arrangement, said display mechanism can indicate a time or an orientation for example and said at least one display can display a piece of information.

According to one embodiment, said display mechanism comprises at least one first motor, at least one second motor and/or at least one third motor configured to drive said at least one first mobile element, said at least one support and/or said at least one second mobile element.

Via one of these arrangements, said at least one first mobile element, said at least one support and/or said at least one second mobile element can be driven independently or together.

According to one embodiment, said at least one second mobile element can be fastened to a wheel mounted movably about an axis on said at least one support and can cooperate with a complementary toothing belonging to said at least one first mobile element.

According to one embodiment, said display mechanism comprises at least one elastic stop member configured to be stopped against at least one tooth of a wheel.

Via this arrangement, a freewheel can be formed.

The present invention proposes solving all or a part of the disadvantages via a watch comprising a flange and said display mechanism according to any one of the previous claims and wherein said at least one first mobile element and/or said at least one support is disposed or are disposed under the flange.

According to one embodiment, said watch comprises a bezel configured to move said at least one first mobile element with said first primary speed and said first secondary speed, and/or said at least one support with said second primary speed and said second secondary speed, so that said at least one second mobile element is mobile between said at least one first position and said at least one second position when said first primary speed and/or said first secondary speed of said at least one first mobile element is different or are different from said second primary speed and/or said second secondary speed of said at least one support.

Via this arrangement, the display of the watch can be totally or partly exposed which allows to maximise the display surface when a piece of information is present on the display of the watch. Moreover, the use of hands to display the time allows a saving of energy with respect to the display of the time or of any other information on the display.

BRIEF DESCRIPTION OF THE DRAWINGS

The invention will be described below in a more detailed manner using the appended drawings, given as examples that are in no way limiting, in which.

DETAILED DESCRIPTION OF THE INVENTION

Figure 1A:
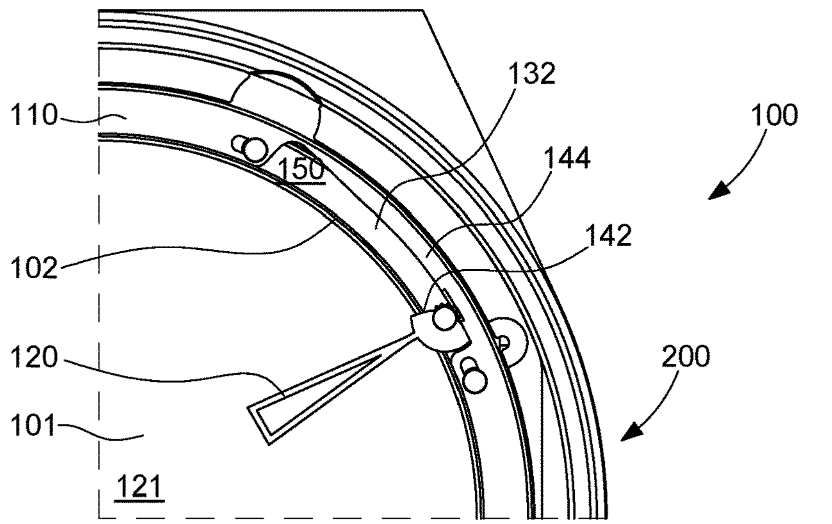
FIGS. 1A-1B show said display mechanism 100 according to a first embodiment.

The present invention proposes a new type of smartwatch via the association of a digital display via an OLED screen and an analogue display using a conventional indicator that the hands can be.

Indeed, the present invention allows to display the time via the conventional indicators that the hands of a watch can be, thus allowing the smartwatch to not have the screen continuously turned on. Moreover, the use of hands to display the time allows a saving of energy with respect to the display of the time or any other information on an OLED screen.

In addition, the major advantage of the present invention is that the display can be totally or partly exposed which allows to maximise the display surface when a piece of information is present on the display.

Indeed, said display mechanism 100 according to the invention can comprise at least one display 101, which can be in the form of at least one OLED screen 101 and at least one second mobile element 120, which can be in the form of an indicator 120 or of a hand 120.

Said at least one second mobile element 120 can be movably mounted on said at least one first mobile element 110 and/or said at least one support 132 can be configured to move between at least one first position 121 in which said at least one second mobile element 120 can indicate an indication and thus totally or partly cover said at least one display 101 in a primary operating mode and at least one second position 122 so as to totally or partly expose said at least one display 101, preferably said piece of information, in a secondary operating mode. In said secondary operating mode and more precisely, in said at least one second position 122, said at least one second mobile element 120 is totally or partly outside of said at least one display 101 in said at least one second position 122, which allows to maximise the display surface when a piece of information is present on the display.

It is surely useless to specify that the present invention could in particular be integrated into a watch that does not comprise an OLED screen 101 but a very aesthetically pleasing dial and thus, the user could move the hands 120 via a bezel of the watch 200 so as to free the dial of these hands and thus fully display said dial without necessarily including an OLED screen, for example.

To do this, the present invention can be in the form of a display mechanism 100 for a watch 200, preferably in the form of a display mechanism 100 of a watch 200, and can include said primary and secondary operating modes, as will be described below.

Said display mechanism 100 can comprise said at least one display 101, configured to display a piece of information, said at least one second mobile element 120 but also at least one first mobile element 110, and at least one support.

Said watch 200 can comprise a flange 201 under which said display mechanism 100, preferably said at least one first mobile element 110 and/or said at least one support can be disposed.

Figure 1B:
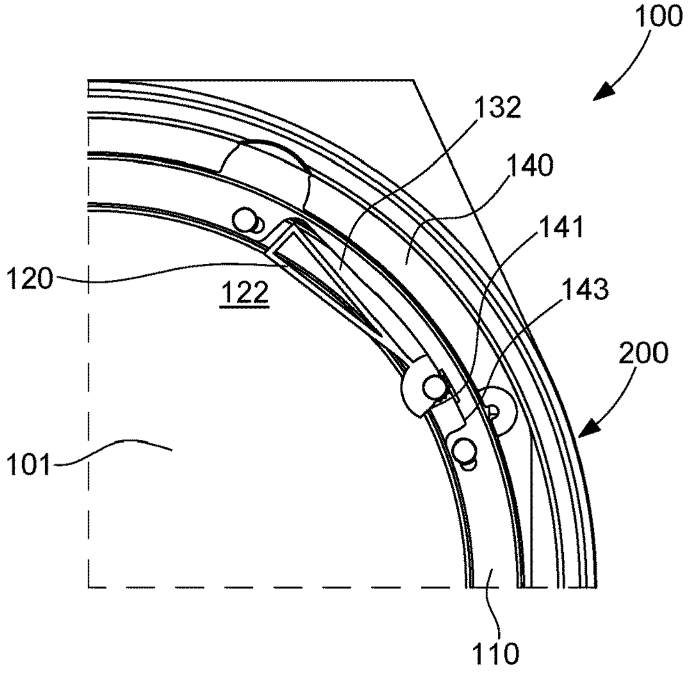

Said at least one first mobile element 110, visible in FIGS. 1A-1B for example, can be mounted to slide on and/or against said at least one support on the one hand and on the other hand can be disposed next to said at least one display 101, or, according to the embodiments, can be located on the periphery and/or at the periphery of said at least one display 101 and can be configured to move with a first primary speed in said primary operating mode and with a first secondary speed in said secondary operating mode.

As for said at least one support, it can also be mounted to slide on or against said at least one first mobile element 110 on the one hand and on the other hand can be disposed next to said at least one display 101, or, according to the embodiments, can also be located on the periphery and/or at the periphery of said at least one display 101 and can be configured to allow the movement of said at least one second mobile element 120 between said at least one first position 121 and said at least one second position 122 according to said first primary speed and said first secondary speed.

Moreover, as will be described in the embodiments, said at least one support 132 can be immobile or can move with a second primary speed in said primary operating mode and with a second secondary speed in a secondary operating mode so as to allow the movement of said at least one second mobile element 120 between said at least one first position 121 and said at least one second position 122.

Indeed, said at least one second mobile element 120 can move between said at least one first position 121 and said at least one second position 122 when said first primary speed is different than said second primary speed and/or when said first secondary speed is different than said second secondary speed or when said at least one first mobile element 110 slides on and/or against said at least one support or inversely when said at least one support 132 slides on and/or against said at least one first mobile element 110.

In addition, when said at least one first mobile element 110 moves with said first primary speed in said primary operating mode and with said first secondary speed in said secondary operating mode, these said speeds, that is to say said first primary speed and said first secondary speed can be determined with respect to said at least one support and can both comprise their own direction of movement, their own orientation of movement and their own speed of movement. In other words, said first primary speed can be determined with respect to said at least one support and can comprise a first primary direction of movement with respect to said at least one support, a first primary orientation of movement with respect to said at least one support and a first primary speed of movement with respect to said at least one support. The same applies to said first secondary speed.

Just like said at least one support 132, which can move with said second primary speed and said second secondary speed with respect to said at least one first mobile element 110. And just like said first primary speed and said first secondary speed, said second primary speed and said second secondary speed can be determined with respect to at least one first mobile element 110 and can both comprise their own direction of movement, their own orientation of movement and their own speed of movement. In other words, said second primary speed can be determined with respect to said at least one first mobile element 110 and can comprise a second primary direction of movement with respect to said at least one first mobile element 110, a second primary orientation of movement with respect to said at least one first mobile element 110 and a second primary speed of movement with respect to said at least one first mobile element 110. The same applies to said second secondary speed.

According to the embodiments described below, said at least one second mobile element 120 can be mobile between said at least one first position 121 and said at least one second position 122 when said at least one first mobile element 110 and/or said at least one support 132 moves or move in the anticlockwise direction or when said at least one first mobile element 110 moves in the anticlockwise direction and said at least one support 131 can be static or when said at least one support 132 moves in the anticlockwise direction and said at least one first mobile element 110 can be static, so that said at least one second mobile element 120 indicates a piece of information when said at least one first mobile element 110 and/or said at least one support 132 moves or move in the same direction of movement and preferably in the clockwise direction, and when said at least one first mobile element 110 or said at least one support 132 moves in the opposite direction and preferably in the anticlockwise direction, said at least one second mobile element 120 totally or partly exposes the display.

These movements of said at least one first mobile element 110 and/or said at least one support 132 can be carried out by at least one drive member 102, preferably a first electric motor for said at least one first mobile element 110 and a second electric motor for said at least one support 132, disposed under said at least one display 101, on the periphery and/or at the periphery of said at least one display 101. According to one embodiment, the movements of said at least one first mobile element 110 and/or said at least one support 132 can be carried out via a bezel, preferably, the bezel of said watch as mentioned above.

Said at least one second mobile element 120 can likewise be moved by at least one third motor and its movement can be limited by at least one primary stop member 141 in said at least one first position 121 and at least one secondary stop member 142 in said at least one second position 122.

Indeed, said at least one primary stop member 141 can be configured to cooperate with at least one primary bearing member 143 so as to be stopped against said at least one primary stop member 141 in said primary operating mode and/or against said at least one secondary stop member 142 in said secondary operating mode.

Preferably, said at least one primary bearing member 143, which can be at least one leaf of a pinion, at least one tooth of a wheel, at least one wall of said at least one first mobile element 110 and/or of said at least one support, can be maintained stopped against said at least one primary stop member 141 in said primary operating mode and/or against said at least one secondary stop member 142 in said secondary operating mode. These stop members, that is to say said at least one primary stop member 141 and/or said at least one secondary stop member 142, can be comprised by said at least one second mobile element 120.

Said at least one secondary stop member 142 can also be configured to cooperate with at least one secondary bearing member 144 so as to be stopped against said at least one primary stop member 141 in said primary operating mode and/or against said at least one secondary stop member 142 in said secondary operating mode.

Preferably, said at least one secondary bearing member 144, which can be at least one leaf of a pinion, at least one tooth of a wheel, at least one wall of said at least one first mobile element 110 and/or of said at least one support, can be maintained stopped against said at least one primary stop member 141 in said primary operating mode and/or against said at least one secondary stop member 142 in said secondary operating mode.

Thus, said at least one second mobile element 120 can cover and thus be visible in said at least one first position 121 or totally or partly expose said at least one display when said at least one first mobile element 110 and said at least one support 132 can be mobile with respect to one another or when said at least one first mobile element 110 or said at least one support can be immobile with respect to one another.

As can be illustrated in certain drawings that accompany this description, the display mechanism 100 can comprise a freewheel 146 including said at least one primary stop member 141, said at least one secondary stop member 142, said at least one primary bearing member 143 and/or said at least one secondary bearing member 144.

Said at least one primary stop member 141, said at least one secondary stop member 142, said at least one primary bearing member 143 and/or said at least one secondary bearing member 144 can also be integrated into said display mechanism 100 in the form of a dragging rack 147 comprising said at least one primary bearing member 143 and said at least one first mobile element 110, or said at least one support, can comprise said at least one primary stop member 141 and/or said at least one secondary bearing member 144.

In another alternative, a Maltese pin 148 can comprise said at least one primary bearing member 143 and said at least one first mobile element 110 and/or said at least one support can comprise said at least one primary stop member 141 and/or said at least one secondary bearing member 144.

Via these various embodiments, said at least one second mobile element 120 can totally or partly expose said at least one display and can be totally and/or partly housed in at least one housing 150 which can be located in said at least one wall of said at least one first mobile element 110 and/or of said at least one support.

Detailed Description of a First Embodiment

The first embodiment can be illustrated by FIGS. 1A and 1B, which give a diagram of said at least one second mobile element 120 in said at least one first position 121 in the primary operating mode and in said at least one second position 122 in a secondary operating mode, respectively.

In this first embodiment, said at least one first mobile element 110 can be mounted to slide and guided by studs on said at least one support 132 and they can both be disposed next to said at least one display 101 and under the flange, even though the flange is not shown in FIGS. 1A-1B.

When said at least one first mobile element 110 and said at least one support 132 are driven in the clockwise direction by the first electric motor 102 with said first primary speed and the second electric motor with said second primary speed, respectively, said at least one second mobile element 120 can be in said at least one first position 121 and indicates the time, for example, in the primary operating mode. Indeed, these first primary speed and second primary speed can be identical in the primary operating mode of the first embodiment.

As is clear from examining FIGS. 1A and 1B, said at least one second mobile element 120 can be fastened to a wheel mounted movably about an axis on said at least one support 132 and cooperates with a complementary toothing belonging to said at least one first mobile element 110.

Given that in the primary operating mode, the first primary speed and second primary speed can be identical, said at least one primary stop member 141 can be stopped against said at least one primary bearing member 143 which is a lateral wall of said at least one first mobile element 110. Said at least one primary stop member 141 would also be stopped against said at least one primary bearing member 143 if the second primary speed was greater than the first primary speed.

Thus, when said at least one first mobile element 110 is immobile or immobilised, or a first secondary speed of zero, and said at least one second mobile element 120 is driven with a second secondary speed different than said one first secondary speed, in this case in the anticlockwise direction, that is to say a second secondary speed positive in the anticlockwise direction but negative with respect to the first secondary speed, the wheel of said at least one second mobile element 120 meshes with the complementary toothing of said at least one first mobile element 110 and moves said at least one second mobile element 120 from said at least one first position 121, FIG. 1A, towards said at least one second position 122, FIG. 1B, until said at least one secondary stop member 142 is stopped on said at least one secondary bearing member 144 which is the lateral wall of said at least one first mobile element 110.

Detailed Description of a Second Embodiment

Figure 2:
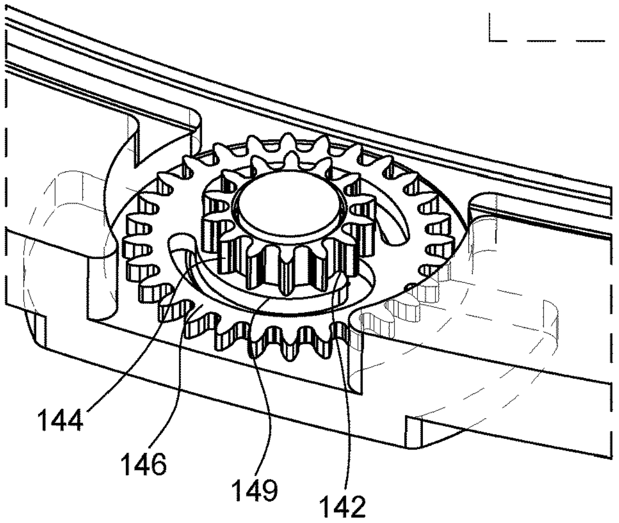
FIG. 2 illustrates a second embodiment of said display mechanism 100 according to the invention.

In this second embodiment shown in FIG. 2, only said at least one primary stop member 141 and said at least one primary bearing member 143 are shown, for reasons of readability.

In a similar manner to the first embodiment, said at least one first mobile element 110 can be mounted to slide on said at least one support 132 and they can both be disposed next to said at least one display 101 and under the flange.

Thus, when said at least one first mobile element 110 and said at least one support 132 are driven in the clockwise direction by the first electric motor with said first primary speed and the second electric motor with said second primary speed, respectively, said at least one second mobile element 120 can be in said at least one first position 121 and indicates the time, for example, in the primary operating mode. Indeed, these first primary speed and second primary speed can be identical in the primary operating mode of the first embodiment.

However, the display mechanism 100 of the second embodiment differs from the first embodiment in that the freewheel 146 can be disposed on the periphery of said at least one first mobile element 110 and of said at least one support 132. Another distinguishing element is the presence of at least one elastic stop member 149 acting as said at least one secondary stop member 142.

Thus, in said primary operating mode, when said at least one first mobile element 110 and said at least one support 132 can be mobile with their first and second primary speeds, the wheel and the pinion rotate simultaneously about the axis, and when one out of said at least one first mobile element 110 and said at least one support 132 is immobile or immobilised, and the other, that is to say said at least one support 132 or said at least one first mobile element 110, is mobile with the second secondary speed or the first secondary speed, respectively, said at least one secondary bearing member 144, in this case the leaf of the pinion, can be stopped against said at least one secondary stop member 142, that is to say said at least one elastic stop member 149, which blocks the freewheel 146 in one direction, but lets it pass in the other direction and thus pivots said at least one second mobile element 120 between said at least one first position 121 and said at least one second position 122.

Detailed Description of a Third Embodiment

Figure 4:
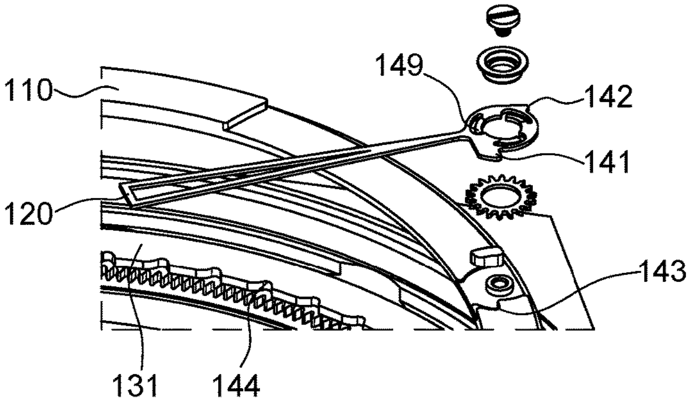

FIG. 4 shows an exploded view of said display mechanism 100 according to a third embodiment.

This third embodiment presents said at least one second mobile element 120 with at least one elastic stop member 149 so as to form a freewheel with the wheel. This wheel can be mounted movably in rotation about an axis and can be disposed on said at least one first mobile element 110.

Figure 3A:
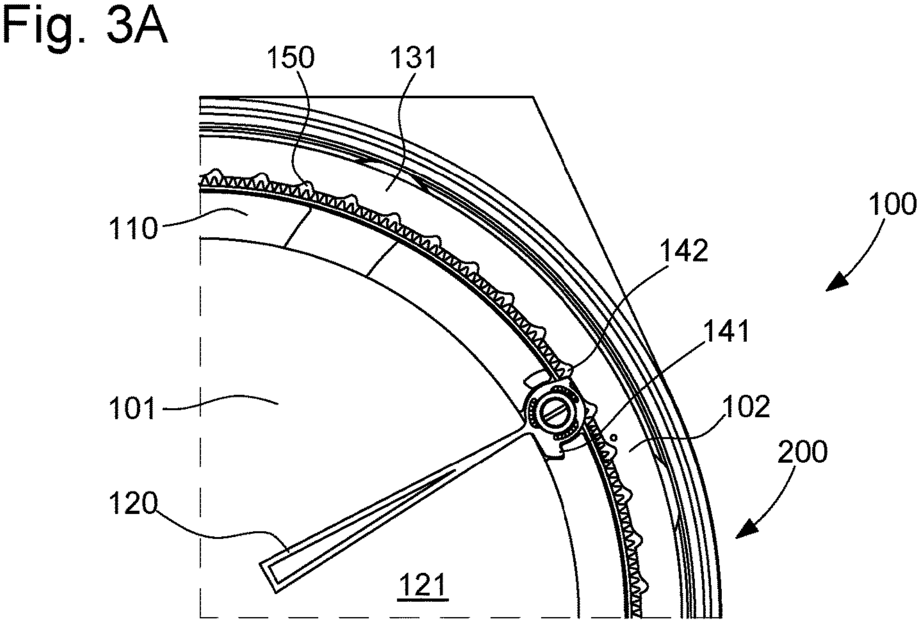
FIGS. 3A-4 illustrate a third embodiment of said display mechanism 100 according to the invention.
Figure 3B:
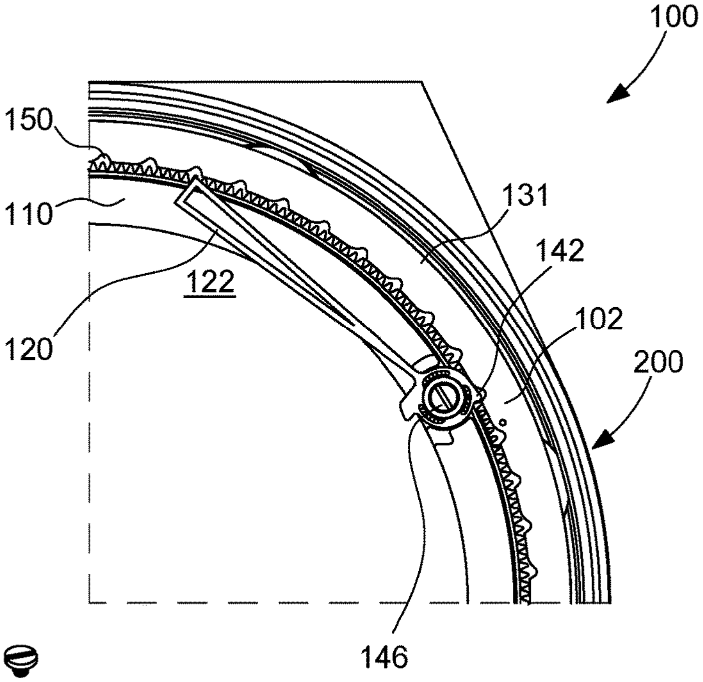

Indeed, as can be seen in FIGS. 3A-3B, said at least one support 131 can comprise a toothing configured to cooperate with the freewheel formed by the wheel and said at least one elastic stop member 149.

Thus, when said at least one first mobile element 110 moves with said first primary speed, said at least one second mobile element 120 can be in said at least one first position 121 since the wheel can be meshed by the toothing of said at least one support 131 and said at least one elastic stop member 149 slides or rubs against the toothing of the wheel, which brings said at least one primary stop member 141 against said at least one primary bearing member 143 in the primary operating mode, FIG. 3A.

As soon as said at least one first mobile element 110 changes direction and thus moves with said first secondary speed, the toothing of the wheel is stopped against said at least one elastic stop member 149 and drives said at least one second mobile element 120 towards said at least one second position 122, FIG. 3B, until said at least one secondary stop member 142 is stopped on said at least one secondary bearing member 144.

In this third embodiment, said at least one primary bearing member 143 can be present on said at least one first mobile element 110 while forming a protrusion on said at least one first mobile element 110 on which a first catch acting as said at least one primary stop member 141 is stopped.

A second catch acting as said at least one secondary stop member 142 is stopped against the wall of a cavity formed in said at least one support 131.

Detailed Description of a Fourth Embodiment

In this fourth embodiment, said at least one second mobile element 120 integrates said at least one primary and secondary stop member 141, 142 and said at least one first mobile element 110 has said at least one primary bearing member 143 like a protrusion.

As for said at least one secondary bearing member 144, it is located on said at least one support 131 and is in the form of a cavity.

Figure 5A:
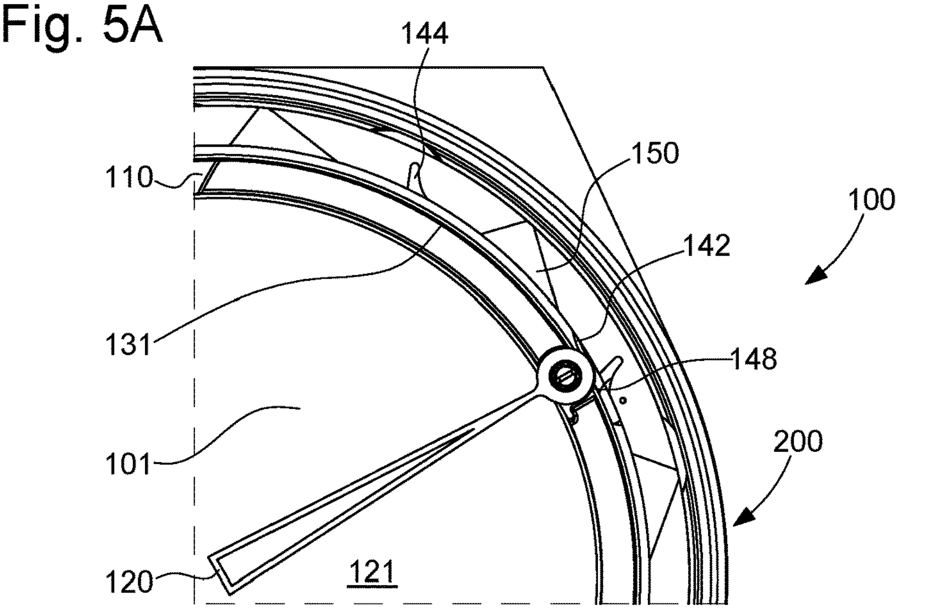
FIGS. 5A-6 disclose said display mechanism 100 according to a fifth embodiment.

Thus, when said at least one first mobile element 110 moves with said first primary speed, said at least one second mobile element 120 can be in said at least one first position 121 since said at least one secondary stop member 142, being elastically deformable, slides or rubs against said at least one support 131, which brings said at least one primary stop member 141 against said at least one primary bearing member 143 in the primary operating mode, FIG. 5A.

Figure 5B:
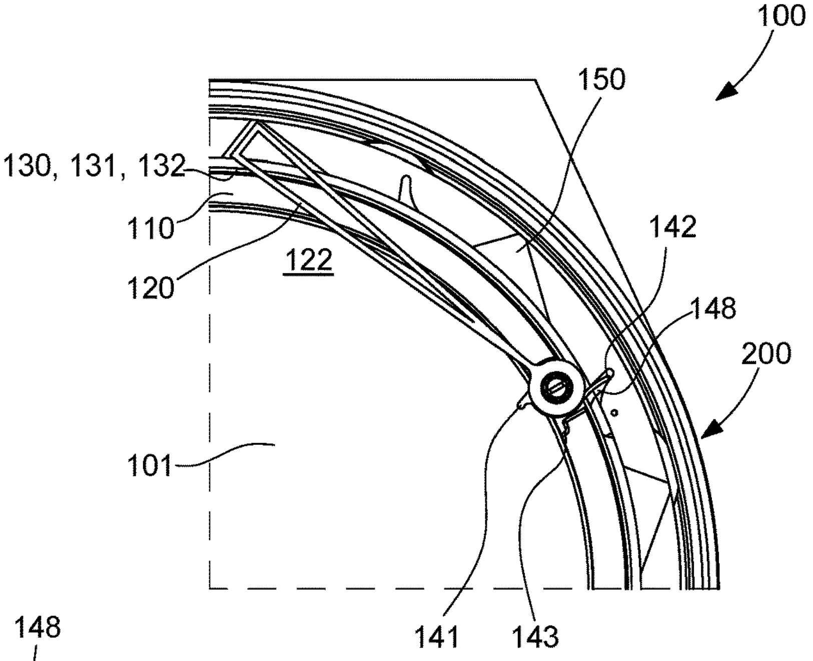
Figure 6:
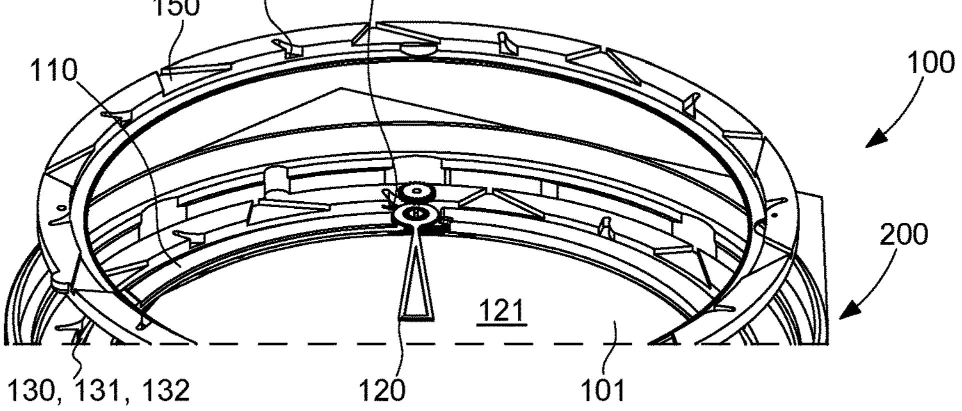

As soon as said at least one first mobile element 110 changes direction and thus moves with said first secondary speed, said at least one secondary stop member 142 is inserted into the cavity of said at least one support 131 and bears against the wall of said cavity, in other words, said at least one secondary stop member 142 can be stopped against said at least one secondary bearing member 144, which drives said at least one second mobile element 120 towards said at least one second position 122, FIG. 5B, until an end of said at least one second mobile element 120 is total and/or partly housed in said at least one housing 150 located in said at least one support 131.

With regard to the return travel, said at least one secondary stop member 142 again slides or rubs against the wall of said cavity until it exits said cavity, which pivots said at least one second mobile element 120 from said at least one second position 122 towards said at least one first position 121 and brings said at least one primary stop member 141 against said at least one primary bearing member 143.

Detailed Description of a Fifth Embodiment

Figure 7A:
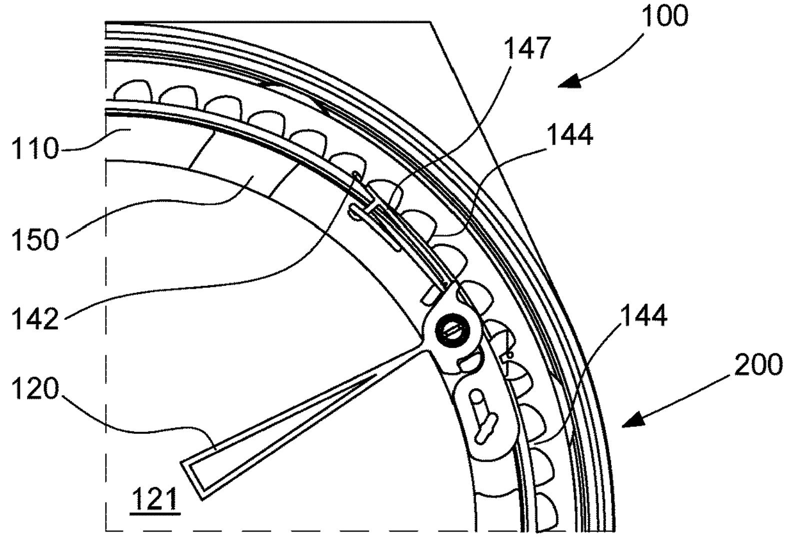
FIGS. 7A-8 show an example of said display mechanism 100 according to a fifth embodiment.

The fifth embodiment more or less repeats the features of said at least one second mobile element 120 since said at least one second mobile element 120 can be provided with the wheel and said at least one primary stop member 141 which is stopped against said at least one primary bearing member 143 present on said at least one first mobile element 110 in the primary operating mode, FIG. 7A.

In this fifth embodiment, the toothing cooperating with the wheel can be disposed on said dragging rack 147. Said dragging rack 147 can be composed of a main part comprising a groove allowing the sliding of said dragging rack 147 on a stud in the shape of a “T” or a pin in the shape of a “T”, that is to say a longitudinal stud ending in a transverse part configured to retain said dragging rack 147, of said at least one first mobile element 110.

Thus, when said at least one first mobile element 110 moves with said first primary speed, said at least one second mobile element 120 can be in said at least one first position 121 since said dragging rack 147 can be stopped against the stud at one end of the groove, which via the toothing of said dragging rack 147 brings said at least one primary stop member 141 to be placed against said at least one primary bearing member 143 in the primary operating mode, FIG. 7A.

As soon as said at least one first mobile element 110 changes direction and thus moves with said first secondary speed, the stud moves in the groove of the main part of said dragging rack 147 and is stopped against another end of said groove and thus moves the auxiliary part of said dragging rack 147 including said at least one secondary stop member 142 against the wall of a cavity formed in said at least one support 131 forming said at least one secondary bearing member 144.

Figure 7B:
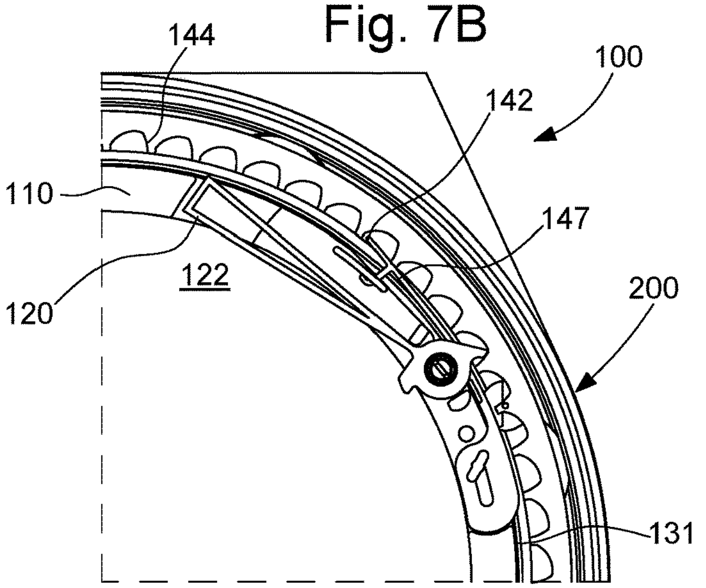
Figure 8:
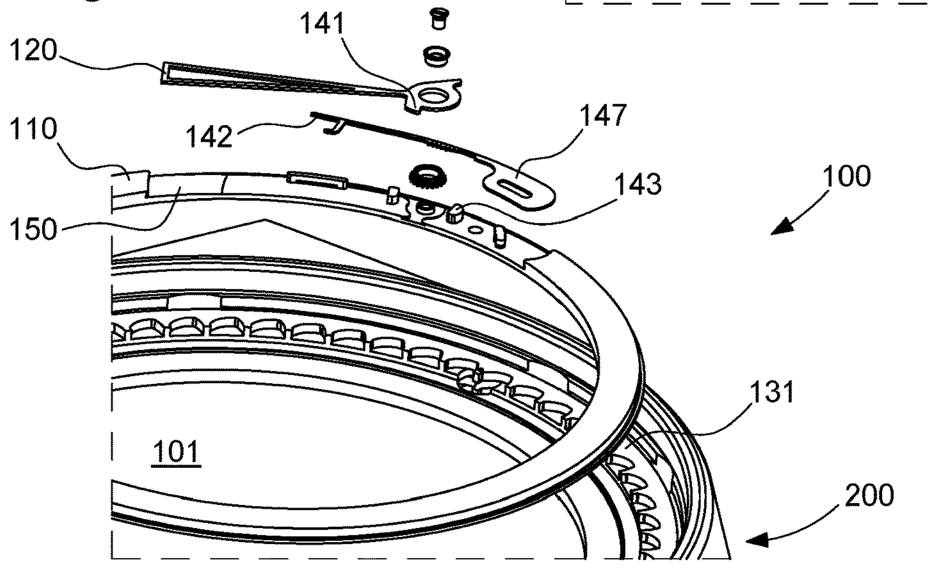
Figure 9:
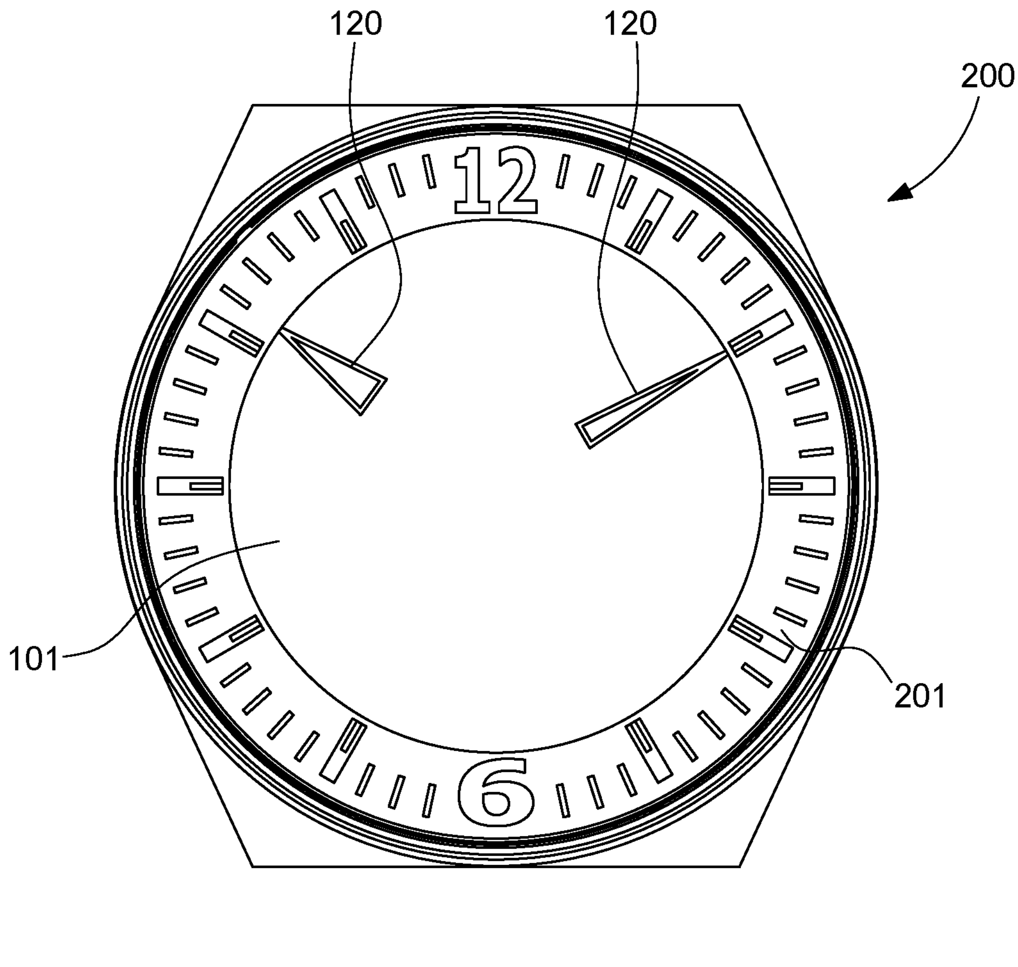
FIG. 9 shows said watch 200 comprising said display mechanism 100 according to one embodiment.

As soon as said at least one secondary bearing member 144 and said at least one secondary stop member 142 are in contact, the toothing of said dragging rack 147 meshes with the wheel of said at least one second mobile element 120 and thus moves said at least one second mobile element 120 from said at least one first position 121 towards said at least one second position 122, FIG. 7B.

The inverse movement, that is to say from said at least one position 122 towards said at least one first position 121, can be carried out via a catch present on said at least one second mobile element 120 which can be configured to bear on the wall of the cavity formed in said at least one support 131, or on said at least one secondary bearing member 144, and pivots said at least one second mobile element 120, and at the same time the wheel, which allows the cooperation of the toothing of the wheel and of said dragging rack 147, so as to make the groove of the main part slide into its initial position.

The invention claimed is:

1. A display mechanism for a watch, said display mechanism comprising:
- a display configured to display a piece of information;
- a first mobile element configured to move with a first primary speed in a primary operating mode and with a first secondary speed in a secondary operating mode;
- a second mobile element configured to rotate between a first position so as to at least partly cover the display in said primary operating mode and a second position so as to totally expose said display in said secondary operating mode; and
- a support configured to allow the movement of said second mobile element between said first position and said second position according to said first primary speed and said first secondary speed; and
- a primary bearing member and a secondary bearing member,
- wherein the second mobile element includes a primary stop member and a secondary stop member, and is attached to, and configured to rotate about, a fixed point on the support or on the first mobile element, and
- wherein, in the primary operating mode, the primary stop member is stopped against the primary bearing member, and in the second operating mode, the secondary stop member is stopped against the secondary bearing member.

2. The display mechanism according to claim 1, wherein said first mobile element and/or said support are on the periphery and/or at the periphery of said display.

3. The display mechanism according to claim 1, wherein the support is configured to move with a second primary speed in said primary operating mode and with a second secondary speed in the secondary operating mode so as to allow the rotation of said second mobile element between said first position and said second position.

4. The display mechanism according to claim 1, wherein said primary bearing member is at least one leaf of a pinion or at least one tooth of a wheel.

5. The display mechanism according to claim 1, wherein said primary bearing member and/or said secondary stop member are at least one wall of said first mobile element and/or of said support.

6. The display mechanism according to claim 1, further comprising a housing configured to totally and/or partly house said second mobile element.

7. The display mechanism according to claim 1, further comprising a drive member disposed under said at least one display or on the periphery and/or at the periphery of said display, wherein the drive member is configured to move said first mobile element and/or said support.

8. The display mechanism according to claim 1, wherein said second mobile element is movably mounted on said first mobile element and/or said support.

9. The display mechanism according to claim 1, wherein said first mobile element is mounted to slide on and/or against said support or said support is mounted to slide on or against said first mobile element.

10. The display mechanism according to claim 1, wherein said second mobile element is configured to indicate an indication in said first position and/or in said second position.

11. The display mechanism according to claim 1, further comprising a first motor, a second motor, a third motor, each configured to drive said first mobile element, said support, and/or said second mobile element.

12. A watch, comprising:

a flange, and said display mechanism according to claim 1, wherein said first mobile element and/or said support is disposed under the flange.

13. The watch of claim 12, further comprising a bezel configured to move said first mobile element with said first primary speed and said first secondary speed, and/or said support with said second primary speed and said second secondary speed, so that said second mobile element is mobile between said first position and said second position when said first primary speed and/or said first secondary speed of said first mobile element is different from said second primary speed and/or said second secondary speed of said support.

14. A display mechanism for a watch, the display mechanism comprising:

a display configured to display a piece of information;

a first mobile element configured to move with a first primary speed in a primary operating mode and with a first secondary speed in a secondary operating mode;

a second mobile element configured to move between a first position so as to primarily cover the display in the primary operating mode and a second position so as to primarily expose the display in the secondary operating mode; and a support configured to allow the movement of the second mobile element between the first position and the second position according to the first primary speed and the first secondary speed, wherein the first mobile element is mounted to slide on and/or against the support or the support is mounted to slide on or against the first mobile element.

15. A display mechanism for a watch, the display mechanism comprising:

a display configured to display a piece of information;

a first mobile element configured to move with a first primary speed in a primary operating mode and with a first secondary speed in a secondary operating mode;

a second mobile element configured to move between a first position so as to primarily cover the display in the primary operating mode and a second position so as to primarily expose the display in the secondary operating mode; and a support configured to allow the movement of the second mobile element between the first position and the second position according to the first primary speed and the first secondary speed, wherein the support is configured to move with a second primary speed in the primary operating mode and with a second secondary speed in the secondary operating mode so as to allow the rotation of the second mobile element between the first position and the second position.

* * * * *